United States Patent [19]
Robinson

[11] 3,784,130
[45] Jan. 8, 1974

[54] FUEL SYSTEMS FOR AIRCRAFT GAS TURBINE ENGINES

[75] Inventor: Keith Robinson, Churchdown, England

[73] Assignee: Dowty Fuel Systems Limited, Cheltenham, England

[22] Filed: Feb. 29, 1972

[21] Appl. No.: 230,494

[30] Foreign Application Priority Data
Jan. 10, 1972 Great Britain .................. 1,093/72

[52] U.S. Cl. ............... 244/76 J, 60/39.28 R, 60/243
[51] Int. Cl. .......................... B64d 31/00, F02k 3/02
[58] Field of Search ................. 244/76 R, 76 J, 137; 60/39.28, 243

[56] References Cited
UNITED STATES PATENTS
3,002,350  10/1961  Longstreet ......................... 244/76 J
3,160,368  12/1964  Young et al. ...................... 244/76 J
3,601,990   8/1971  Johnson .............................. 60/243

*Primary Examiner*—Duane A. Reger
*Assistant Examiner*—Jesus D. Sotelo
*Attorney*—John W. Malley et al.

[57] ABSTRACT

In an aircraft having a gas-turbine engine, one or more main jet nozzles directed downwardly to provide weight-supporting thrust for the aircraft, a plurality of stabilising nozzles, duct-means for feeding air at pressure from the engine compressor to the stabilising nozzles, and a pilot's adjustable valve means for adjusting air flow from the stabilising nozzles to control the attitude of the aircraft, the provision of a fuel system for the engine comprising, a source of fuel at pressure, a constant speed fuel flow control to feed fuel from the source to the engine for constant and slowly varying speeds, an acceleration fuel flow control to feed fuel from the source to the engine during engine acceleration at a rate ensuring safe acceleration without compressor stall, an auxiliary fuel flow control and control means for said auxiliary fuel flow control responsive to air flow to one or more stabilising nozzles to supply extra fuel flow to the engine during engine acceleration over and above the fuel flow supplied by the acceleration fuel flow control.

9 Claims, 6 Drawing Figures

FUEL SYSTEMS FOR AIRCRAFT GAS TURBINE ENGINES

This invention relates to an aircraft gas-turbine engine fuel system and more particularly it relates to a fuel system for a gas-turbine engine of an aircraft having at least one main jet nozzle directed downwardly to provide weight supporting thrust for the aircraft, a plurality of stabilising nozzles, duct means for feeding air at pressure from the engine compressor to the stabilising nozzles, and a pilot's adjustable valve means for adjusting air flow from the stabilising nozzles to control the attitude of the aircraft. With an aircraft of this nature it is highly desirable that the pilot should have the most effective control of the aircraft engine, and in particular that the pilot should be able to accelerate the engine at its maximum rate at any instant during flight. The fuel system for a gas-turbine engine is normally arranged so that acceleration fuel flow is provided to enable engine acceleration at a maximum rate just short of the rate which could cause compressor stall. However, if during an acceleration of a gas-turbine engine a substantial flow of air is bled from the compressor delivery for feeding stabilising nozzles the operating characteristics of the compressor are altered and a normal acceleration fuel flow control would give an acceleration considerably lower than normal acceleration. Such loss of engine acceleration reduces the manoeuverability of the aircraft and could in some circumstances cause the aircraft to crash.

The object of the present invention is to provide a fuel flow control system for a gas-turbine engine of an aircraft of the kind referred to in which the fuel system provides compensation for the loss of acceleration that could otherwise take place when air from the engine compressor is fed to stabilising nozzles.

In an aircraft having a gas-turbine engine, at least one main jet nozzle directed downwardly to provide weight supporting thrust for the aircraft, a plurality of stabilising nozzles, duct means for feeding air at pressure from the engine compressor to the stabilising nozzles, and a pilot's adjustable valve means for adjusting air flow from the stabilising nozzles to control the attitude of the aircraft, the present invention comprises the provision of a fuel system for the engine comprising a source of fuel at pressure, a constant speed fuel flow control to feed fuel from the source to the engine for constant and slowly varying speeds, an acceleration fuel flow control to feed fuel from the source to the engine during engine acceleration at a rate ensuring safe acceleration without compressor stall, an auxiliary fuel flow control, and a control means for said auxiliary fuel flow control responsive to air flow to at least one stabilising nozzle to supply extra fuel flow to the engine during engine acceleration over and above the fuel flow supplied by the acceleration fuel flow control.

Compensating means may be provided for said auxiliary fuel flow control responsive to compressor delivery pressure within the engine and/or to engine speed.

The auxiliary fuel flow control may be arranged to supply extra fuel flow in accordance with the air flow rate selected for the stabilising nozzles.

The acceleration fuel flow control may comprise a main variable throttle through which fuel flows to the engine, first-adjustment means for the main throttle controlled by at least one engine air pressure, a by-pass valve connected to by-pass fuel from upstream of the throttle, and pressure drop means responsive to pressure drop at the throttle to adjust the by-pass valve so that the remaining fuel flow passing through the throttle to the engine gives a predetermined pressure drop at the throttle.

The predetermined pressure drop may be arranged to vary in accordance with the square of engine speed.

The auxiliary fuel flow control may comprise an auxiliary variable throttle connected in parallel with the said main variable throttle, and auxiliary adjustment means for the auxiliary throttle responsive to the air flow rate within the duct means to adjust the auxiliary throttle so that the extra fuel flow to the engine permitted by the auxiliary throttle is in accordance with the air flow rate within the duct means.

One embodiment of the invention will now be described with reference to the accompanying drawings, in which.

Figure 1:
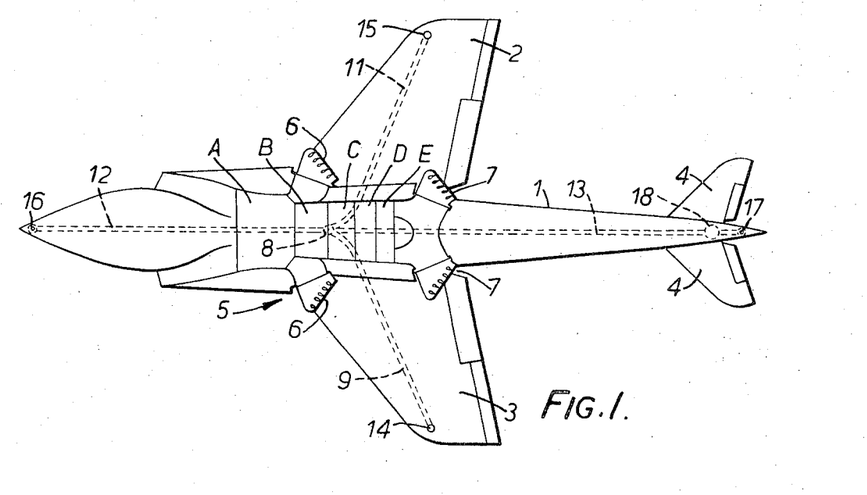
FIG. 1 is a diagrammatic elevation of an aircraft including a two-spool gas-turbine engine and stabilising jets.

Reference is made initially to FIG. 1 of the drawings. The aircraft is conventionally provided with a fuselage 1, wings 2 and 3, tail planes 4 and a rudder. The engine 5 mounted in the aircraft is of the two-spool kind embodying a low pressure compressor A, a high pressure compressor B, combustion chamber C, a high pressure turbine D and a low pressure turbine E. The compressor A, and turbine E are mounted on a single shaft for rotation together whilst the compressor B and turbine D are mounted on another shaft for rotation together co-axially with compressor A and turbine E. The low pressure compressor delivers compressed air both to the high pressure compressor B and to a pair of swivelling nozzles 6 which may be adjusted to produce either horizontal or vertical thrust. The air delivered by the high pressure compressor B enters the combustion chambers C and the high temperature gas leaving the combustion chambers passes the high pressure turbine and the low pressure turbine in succession. The exhaust gases from the low pressure turbine are fed to a second pair of swivelling nozzles 7 adjustable with the nozzles 6 to provide vertical or horizontal thrust.

A bleed connection 8 from the high pressure compressor B connects to a duct system comprising four ducts 9, 11, 12 and 13 leading respectively to stabilising jets 14, 15, 16 and 17 located respectively at the two wing tips, the nose and the tail of the aircraft. The duct 13 is also connected to a pair of opposed horizontal jets 18 mounted adjacent to the aircraft rudder. The stabilising jets 14, 15, 17 and 18 are provided with obturators connected for operation by the adjacent control surfaces on the wings, tail and rudder. The nose jet 16 is provided with an obturator also controlled by the pilot's control leading to the tail control surfaces. An aircraft of this nature is already known and one example may be seen in U.S. Pat. No. 3,160,368.

Figure 2:
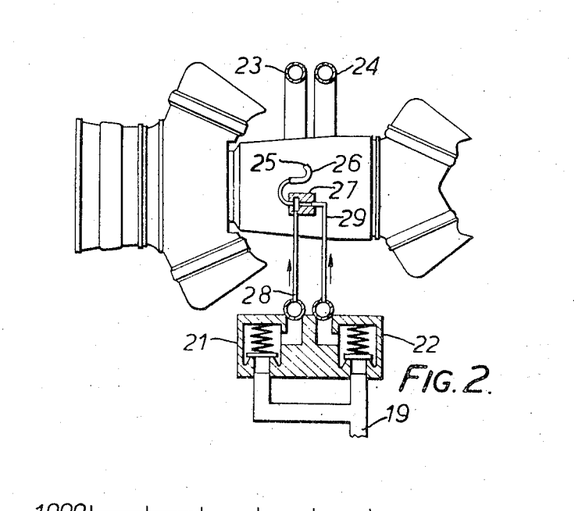
FIG. 2 is a diagrammatic plan view of the engine in FIG. 1 and the gallery system feeding the burners which forms part of the present invention.
Figure 3:
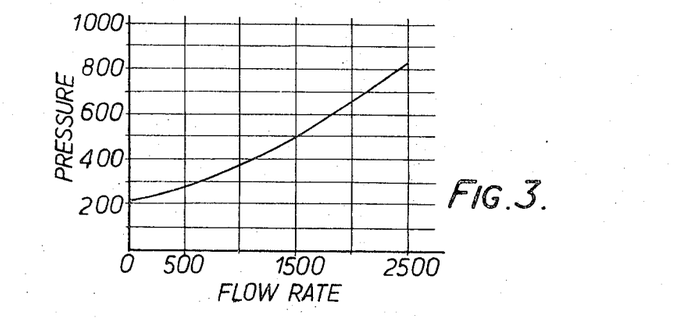
FIG. 3 is a graph showing a desired relation between fuel pressure and flow rate obtained by the arrangement in FIG. 2.

In order to feed fuel to the combustion chambers, a fuel gallery arrangement is provided as diagrammatically illustrated in FIG. 2. Fuel enters the engine at a pipe 19 and passes to a pair of pressure relief valves 21 and 22, the valve 21 having a lower effective spring loading than the valve 22. The deliveries from valves 21 and 22 connect respectively to a pair of circular galleries 23 and 24 encircling the engine at the location of the combustion chambers. A number of vapourising burner assemblies 25 are provided around the engine feeding to the combustion chambers. Each burner assembly includes a vapourising tube 26 fed with fuel from a swirl chamber 27. A connection 28 from gallery 23 enters the swirl chamber tangentially and a second pipe 29 from the gallery 24 enters the swirl chamber axially. The main purpose of the swirl chambers is to equalise flow to all burner assemblies without involving small diameter orifices which could become choked with solid contaminants in the fuel. Fuel from the pipe 28 produces the basic swirl in the chamber 27 and fuel which enters from the pipe 29 is also thereby swirled by virtue of the swirling fuel already within the chamber 27. The lower pressure loading of the valve 21 ensures that for low flow rates fuel enters only through valve 21, gallery 23, pipes 28 and the swirl chambers 27. When the fuel pressure reaches a predetermined value the valve 22 will open carrying further fuel into the swirl chambers through galleries 24 and pipes 29. The main function of the valves 21 and 22 is to provide an almost linear relation between fuel pressure in pipe 19 and the actual total flow rate of fuel into the engine. A simple swirl chamber device on its own would produce a square-law characteristic which over the range of fuel flows required for the engine would produce an unacceptably high pressure at maximum fuel flow. Additionally the near linear relation between pressure and fuel flow rate is usefully employed within the fuel control system of FIG. 4 as will be described in order to assist in the stable governing of the engine.

Figure 4A:
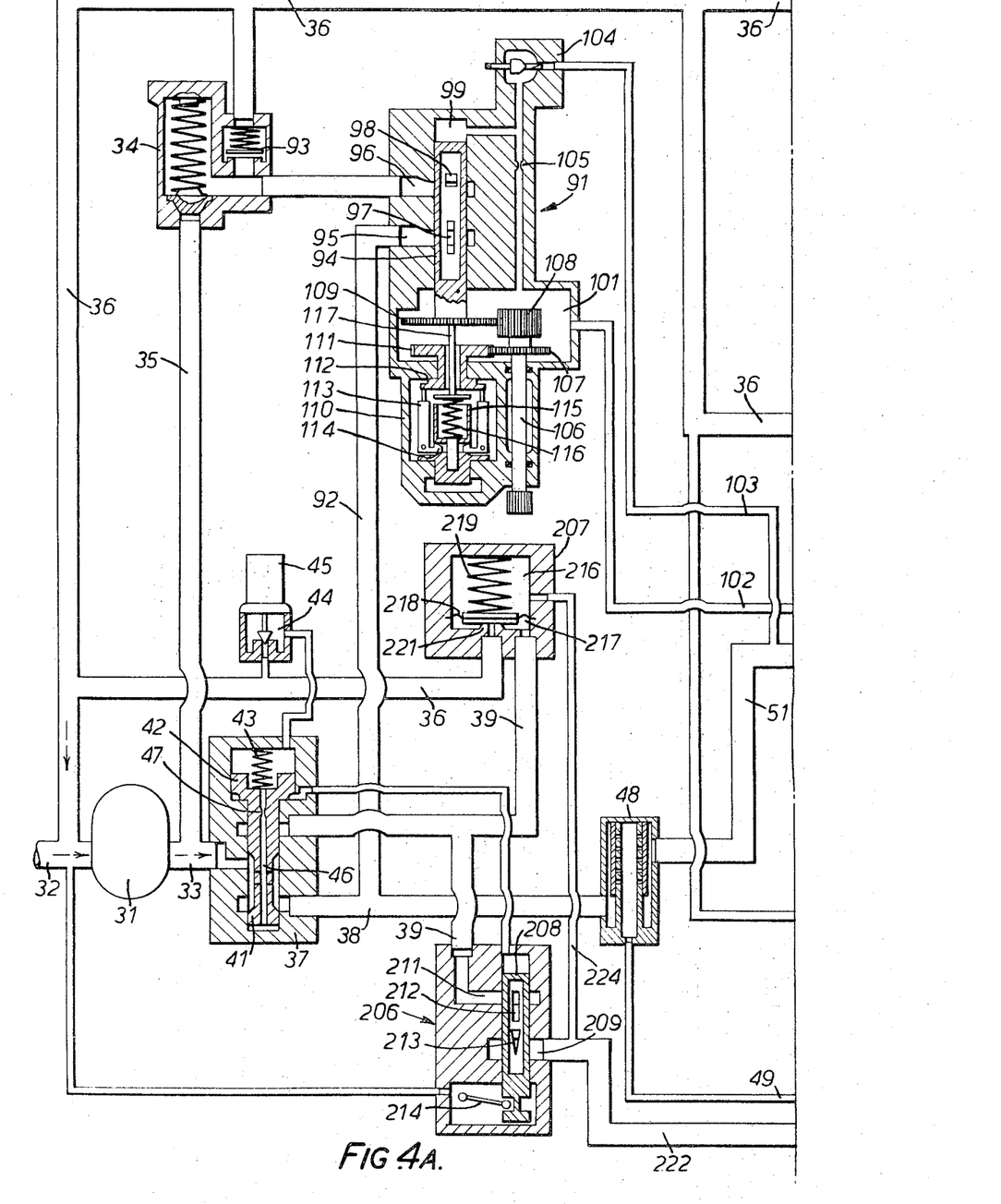
FIG. 4 is a diagram of the fuel system for feeding fuel to the engine of FIGS. 1 and 2 which is shown in three parts joinable together, the parts being indicated as FIGS. 4A, 4B and 4C.
Figure 4B:
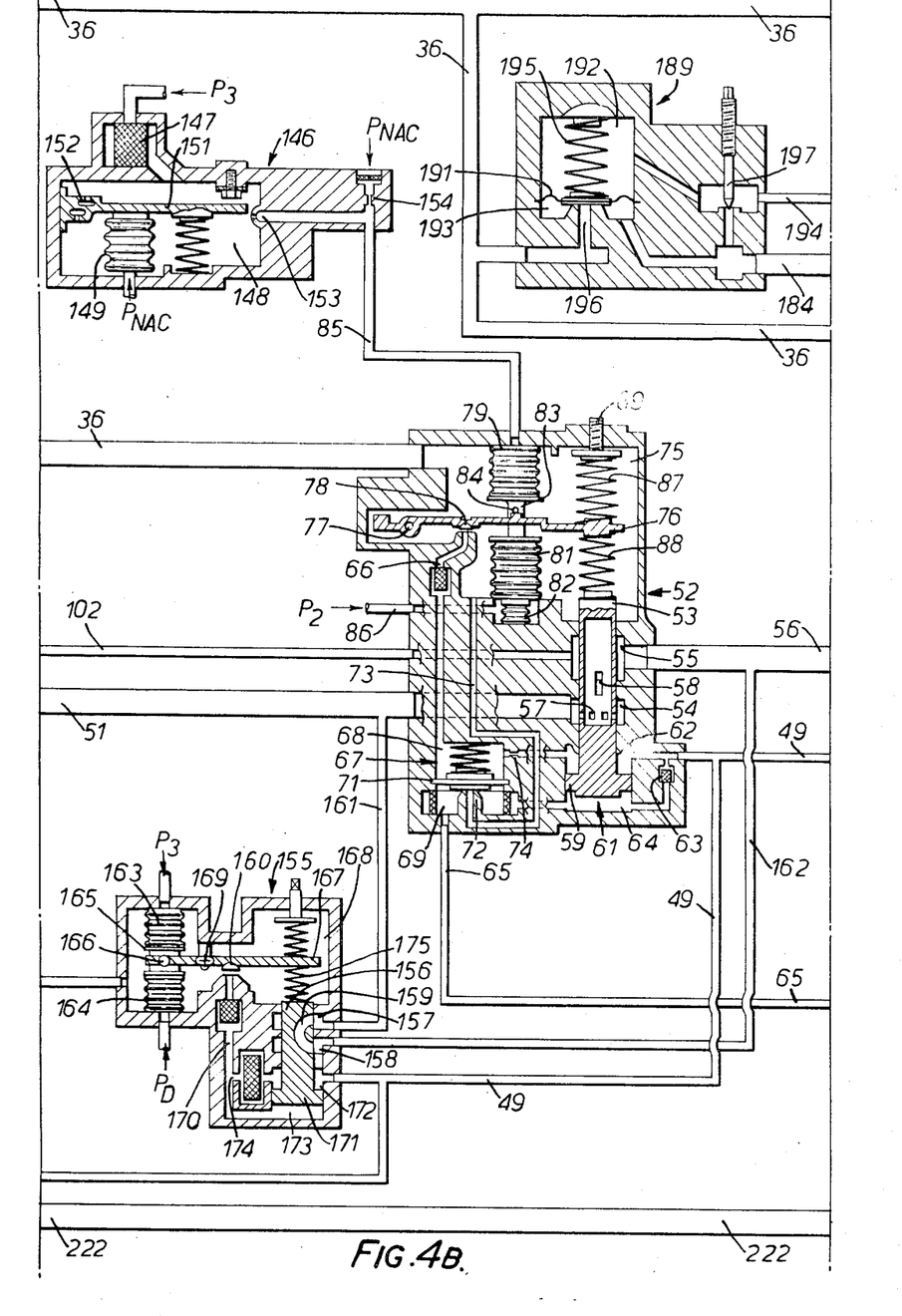
Figure 4C:
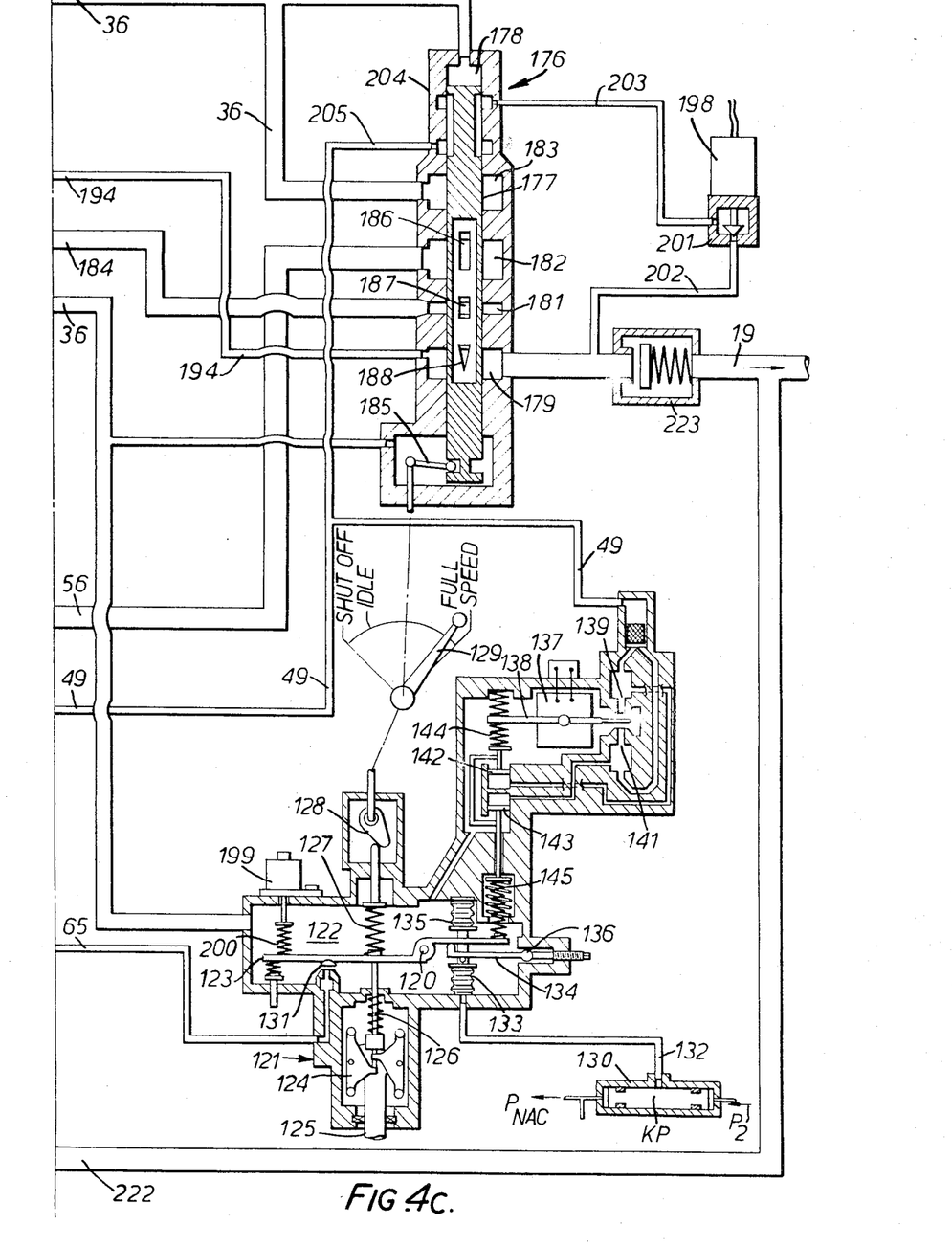

Reference is now made to FIG. 4 of the accompanying drawings. Fuel is delivered from the aircraft fuel tank in a conventional manner by means of a boost pump (not shown) and an engine-driven gear pump 31. Fuel enters the pump at pipe 32 and leaves at pipe 33. A pressure relief valve 34 by-passes fuel above a predetermined maximum pressure from the delivery pipe 33 through a pipe 35 and back into a boost pressure pipe network 36 which connects back to the pump inlet 32. The fuel from pipe 33 initially enters an emergency change-over valve 37 which is capable of delivering the flow from pipe 33 into either the normal deilivery pipe 38 or the emergency delivery pipe 39. The controlling spool 41 within valve 37 is servo-adjusted by means of a piston 42 slidable within a cylinder 43 and a vent valve 44 adjusted by a solenoid 45. High pressure liquid from pipe 33 has access within the spool 41 to a central passage 46 from which fuel may flow both to the lower end of the spool 41 and through a restrictor 47 to the cylinder 43. When valve 44 opens to vent cylinder 43 fuel at pressure acting on the lower end of the spool 41 will push the spool 41 upwardly to connect the delivery 33 to the emergency pipe 39. Normally the valve 44 remains closed enabling pressure to exist in cylinder 43 to hold the spool 41 in its lowermost position in which the delivery pipe 33 is connected to the pipe 38.

The pipe 38 connects to a filter 48 whose function is to deliver to pipe 49 a small filtered flow of fuel suitable for servo use within the fuel system. The main delivery from pipe 38 however leaves filter 48 at pipe 51 to enter the first throttle valve 52.

Within valve 52 the throttle element comprises a hollow piston 53 slidable in a valve cylinder to control the opening between a port 54 connected to the inlet pipe 51 and a port 55 connected to an output pipe 56. Within the hollow piston, ports 57 permanently connect the hollow piston to the port 54 whilst a throttle aperture 58 overlaps the port 55 to form a variable throttle whose throttling effect is determined by the position adopted by the piston 53 relative to the port 55. In order to adjust the piston 53 a servo piston 59 is secured to it for sliding movement within a cylinder 61.

The servo supply pipe 49 connects directly to the upper end 62 of the cylinder 61 and indirectly through a restrictor 63 to the lower end 64 of cylinder 61. It will be seen that the upper effective area of piston 59 exposed to full pressure in the end 62 of the cylinder is smaller than the lower area of piston 59 exposed to the end 64 of the cylinder.

The adjustment of the hollow piston 53 is by virtue of two separate vent controls acting on vent pipes 65 and 66. In order to ensure that the servo piston 59 can never be controlled by the joint effect of simultaneous venting of the pipes 65 and 66, a discriminator 67 is provided. The discriminator comprises upper and lower chambers 68 and 69 separated by a flexible diaphragm 71. The diaphragm 71 is normally spring-loaded against a vent 72 in chamber 69 such that if the diaphragm 71 lifts from vent 72 the lower chamber 69 is connected to the low pressure pipe 36 via passage 73. The vent pipe 65 and the lower end 64 of cylinder 61 are directly connected to the chamber 69. The upper chamber 68 is directly connected to vent passage 66 and also through a restrictor 74 to the upper end 62 of cylinder 61.

If the vent pipe 65 is vented, the pressure is reduced in the lower chamber 69 and in the lower end 64 of cylinder 61 and the diaphragm 71 closes vent 72. On the other hand if the vent pipe 65 is closed but pipe 66 is vented, the diaphragm 71 will lift to open the vent 72 a small amount which will allow a controlled reduced pressure in accordance with the reduced pressure in vent 66 to be generated in lower chamber 69 and directly fed to the lower end 64 of cylinder 61. Thus either of the vents 65 or 66 may generate a controlling pressure at the lower end 64 of cylinder 61.

In order to control the vent pipe 66 the upper part of the throttle valve 52 is provided with a chamber 75 within which a lever 76 is pivotally mounted at a fulcrum 77. The lever 76 carries a conventional half-ball valve 78 controlling flow from the vent pipe 66 into the chamber 75 which is in turn connected to the low pressure network 36. Within chamber 75 a bellows assembly is provided comprising three bellows 79, 81 and 82 and an inter-connecting yoke 83 which bears through pin 84 on to the lever 76. The bellows 79 is connected to a pipe 85 and receives a signal derived from the high pressure (P3) delivered by the high pressure compressor B. The bellows 81 is connected to a pipe 86 and receives a signal of the delivery pressure of the low pressure compressor A (P2). The bellows 82 is evacuated. The bellows are mounted by being secured within the chamber 75 to the yoke 83 so that the force exerted on the lever is a function of the difference of the pressure P2 and the pressure derived from P3 and forms part of an acceleration fuel flow controlling system.

Also within the chamber 75 a feed-back spring 88 is provided, beig compressible by movement of the throttle piston 53 so as to exert on the lever 76 a force dependent on the position of piston 53. An adjuster 89 is provided for pre-set datum adjustment of the loading of the spring by adjusting the load in a spring 87 acting on lever 76 in opposition to spring 88.

The thrust exerted by the pin 84 on lever 76 determines the escape flow permitted from the vent 66 into chamber 75. Variation of the pressure signal on the pin 84 will alter the position of the lever 76 which will in turn alter the pressure at the lower end 64 of cylinder 61 to move piston 59 and piston 53 in the sense to alter the compression of spring 88 so that the changed force exerted by the spring will compensate for the change of force exerted by the pin 84 thereby restoring the half-ball valve 78 to a predetermined clearance relative to the vent 66. In other words the position of the piston 53 will be in proportion to the force exerted by the pin 84 on the lever 76. The described positional control for the throttle piston 53 by virtue of the lever 76 will only be effective provided that the vent 65 is closed. The description of the control for vent 65 will appear further in this specification.

The control of fuel flow by the throttle piston 53 is made fully effective by providing a by-pass valve 91 which operates to control a by-pass flow of fuel from the pipe 38 through a by-pass pipe 92 and a low pressure relief valve 93 into the low pressure network 36. The by-pass valve is basically formed by a hollow piston 94 which controls the flow between a pair of ports 95 and 96 in a co-operating cylinder. A port 97 in the hollow piston connects permanently to the port 95 during piston movement and a throttle aperture 98 in overlapping relation with the port 96 determines an adjustable throttle controlling the flow of fuel through the by-pass pipe 92 and valve 93 into the low pressure network 36. Axial adjusting movement of the piston 94 is provided by two opposed signals. The first of these signals is a pressure drop signal between two differing pressures existing in a chamber 99 enclosing the upper end of piston 94 and in a chamber 101 enclosing the lower end of piston 94. The chamber 101 is connected by pipe 102 to the port 55 in the throttle valve 52 and carries the pressure downstream of the throttle valve 52. The upper chamber 99 receives pressure from a pipe 103 connected to the pipe 51 upstream of the throttle valve 52.

For the purpose of adjustment in setting the system up for operation, means are provided for adjusting the relationship between the pressure drop at throttle 52 and the downward force acting on the hollow piston 94, these means comprising a variable restrictor 104 and a fixed restrictor 105 connected in series between the pipes 102 and 103, the space 99 being connected to the junction between the restrictors 104 and 105. In effect the restrictors 104 and 105 form a pre-set potentiometer by which a predetermined portion of the pressure drop between the pipes 102 and 103 may be applied in the space 99 whereby a downward force will act on piston 94 in proportion to the pressure drop occurring at throttle valve 52.

In the lower part of the housing for the by-pass valve 91 a rotary drive shaft 106 is suitably mounted in bearings and is adapted to be driven by the high pressure spool of the engine. The shaft 106 enters the chamber 101 and carries a pair of gears 107 and 108. The gear 108 is of substantial axial length and meshes with a gear 109 to rotate piston 94 to reduce its friction to axial movement. The gear 109 has a larger number of teeth than the gear 108 so that piston 94 rotates at a comparatively slow speed. The gear 107 meshes with a gear 111 to rotate a carrier 112 in a lower chamber 110. On the carrier 112 a set of flyweights 113 are pivotally mounted for centrifuging movement. The flyweights are so constructed that their overall density is about twice the mean density of the range of fuels to be used. The flyweights may be made of metal with internal completely closed cavities to provide the correct overall density. The lower chamber 110 is connected to chamber 101 and by virtue of its pipe connections receives a flow of fuel which at any instant can be said to have the same density as the fuel flowing to the engine. The flyweights will cause rotation of fuel in chamber 110 and the centrifugal force generated on the flyweights will be proportional to the difference in overall density of the flyweights and density of the fuel such that with reducing fuel density the centrifugal force becomes higher and vice versa.

The flyweights 113 are provided with inwardly directed levers 114 to exert an axial thrust on a central cup 115. The cup 115 contains a spring 116 which reacts against a push rod 117 extending from the piston 94. The spring 116 and the cup 115 are so arranged that at low engine speeds the centrifugal force generated by the flyweights 113 cannot overcome the load of spring 116 and the flyweights are held against inward stops on the carrier by the spring load. The spring force then acts as a minimum force on piston 94. At higher speeds when the centrifugal force is higher than the load of spring 116 the cup 115 makes direct contact with the rod 117 so that centrifugal thrust is transmitted directly to the piston 94 in opposition to the pressure drop force exerted on piston 94 by virtue of the pressures in chambers 99 and 101. It will be appreciated that the flyweights 113 must be capable of a substantial range of radial movement in order to effect control movement of the hollow piston 94. The ends of the control levers 114 which react on the hollow cup 115 are so shaped that as the flyweights 113 move outwardly the mechanical leverage of levers 114 is reduced thus to ensure that the thrust exerted by the flyweights 113 on the hollow piston 94 is always in substantially constant proportion to the square of the rotational speed of the high pressure spool in the engine for any fixed value of fuel density at the flyweights.

The operation of the by-pass valve 91 is to ensure that the pressure drop occurring at the throttle valve 52 is in proportion to the centrifugal force exerted by the flyweights 113. The square-law characteristic between pressure drop and flow at the throttle aperture 58 will then ensure that the mass flow rate of fuel passing through the throttle aperture 58 is directly proportional to the speed of the high pressure spool for any one setting of the throttle 58 independently of normal fuel density changes, the surplus fuel being by-passed from pipe 38 through pipe 92 and the adjustable throttle aperture 98 back to the low pressure network 36. The function of the spring 116 at low engine speeds is to ensure a small excess of fuel at light-up by providing a minimum force acting on piston 94 in opposition to the pressure drop force. Over the range of normal running speeds, the cup 115 will directly contact the rod 117 ensuring that the centrifugal force from flyweights 113 is directly transmitted to piston 94.

The acceleration fuel flow determined by the throttle 52 is in part determined by the pressure drop function applied by the by-pass valve 91 and in part by the setting of the piston 53 by virtue of the bellows assembly 79, 81, 82. The throttle aperture 58 may have a suitable shaping to ensure that acceleration fuel flow under all conditions of operation is just below the value which could cause compressor stall.

Acceleration fuel metering by the throttle 52 takes place only under conditions when the vent 65 is closed. The vent 65 extends to the mechanical governor unit 121. Within the governor unit 121 a chamber 122 is provided within which a lever 123 is pivotally mounted at a fulcrum 120. A number of forces are arranged to act on the lever 121, the principal being the centrifugal force given by a set of flyweights 124 which are rotatably driven by a shaft 125 from the low pressure spool in the engine. The flyweights 124 are of well-known kind which provide insensitivity of output force to any variation in density of liquid within which they rotate. As is usual with aircraft engine fuel control systems the flyweights are very conveniently submerged in fuel so that insensitivity to variation in fuel density is obtained. The centrifugal force due to flyweight rotation is transmitted through a rod 126 to act on the lever 123. An adjustable compression spring 127 acts in the opposite direction on lever 123, the loading of this spring being adjusted by a cam 128 which is mechanically connected for adjustment by the pilot's control lever 129. The lever 123 acts on a half-ball valve 131 which controls the escape flow from the vent pipe 65. It will be seen that fuel escaping from the vent pipe 65 enters the chamber 122 from which it will have access to the flyweights 124 and also will be able to escape to the low pressure pipe network 36. The lever 123 and half-ball valve 131 are so arranged that a very small movement (approximately .002 inches) is necessary at the half-ball valve to adjust the vent pipe 65 between the fully closed and the fully open position. This ensures that the range of centrifugal movement of the flyweights 124 is kept to an absolute minimum to assist in accurate space governing. When the half-ball valve 131 opens slightly to provide governing control, the vented fuel from the lower chamber 69 in the throttle valve 52 will reduce the pressure in chamber 69 and the lower end 64 of cylinder 61 thus causing diaphragm 71 to close vent 72. When vent 72 is closed the control of movement of the piston 53 is entirely under the control of the half-ball valve 131. The fact that the pressure drop across the throttle 52 is controlled to the square of high pressure spool speed is then of no consequence since the pressure drop is only able to alter a small amount compared with the large change in area of the orifice 58 resulting from movement of half-ball valve 131. Inaccuracy of the mechanical governor 121 with variation in altitude of the aircraft can occur as a result of the very substantial change in fuel flow with altitude to maintain a particular engine speed. With increase in altitude the fuel required to maintain a particular engine speed will reduce very substantially. The pressure of fuel supplied to the engine at the pipe 19 will depend on the flow rate of fuel to the engine in accordance with the graph of FIG. 3 and this pressure variation with variation in fuel flow is reacted on the lever 123 through the half-ball valve 131 with the result that with increase in altitude a desired speed selected on the pilot's lever 129 will creep upwardly. This tendency is compensated by a creep control which exerts a compensating force on lever 123. A restrictor potentiometer 130 is fed with low pressure delivery pressure (P2) from the engine and it delivers into the pipe 132 a fixed proportion of this pressure. This pressure is fed to a bellows 133 which reacts on an auxiliary lever 134. The bellows 133 is opposed by an evacuated bellows 135 to ensure that the force acting on lever 134 remains in proportion to the absolute value of pressure in pipe 132. The fulcrum 136 of the lever 134 is adjustable to vary the point at which the lever 134 engages lever 123 relative to its fulcrum 120. Thus with increase in altitude the reduced fuel pressure force acting on the half-ball valve 131 is compensated by reduction in the thrust exerted by the bellows 133 on the lever 123, thus compensating the governor creep.

An emergency protection must be provided to protect the engine in the case of excessive turbine temperatures and it is necessary whenever an excessive temperature occurs for quick action to be taken to reduce fuel flow. In the present fuel system this is conveniently effected through the mechanical governor 121. An electric thermocouple temperature sensing device for the jet pipe of the engine is arranged to operate through an amplifier to generate an electric signal dependent on jet pipe temperature which is connected to an electric force motor 137 to exert a corresponding torque on a lever 138. The torque exerted on lever 138 is quite small and it is amplified by a hydraulic amplifier device comprising opposed jets 139 and 141 and opposed mechanically-connected servo-pistons 142 and 143. The lever 138 extends as a flapper in between the jets 139 and 141 and varies the relative escape flows from these jets. The jets 139 and 141 receive operating fuel from the servo supply pipe 49 and the relative escape flows at the jets 139 and 141 will, by virtue of restrictors, generate pressure which act oppositely on the pistons 142 and 143. Spring 144 feeds back the movement of pistons 142 and 143 on to the lever 138 so that the movement of the pistons 142 and 143 is in accordance with the torque exerted by the motor 137. The pistons 142 and 143 react together through a spring 145 on to the control lever 123 in such manner that, on the occurrence of excess jet pipe temperature, the spring 145 will exert an extra force on the lever 123 to lift the half-ball valve 131 from the vent 65 to move piston 53 to reduce the throttle aperture 58 and thus reduce fuel flow to the engine.

Another safety precaution necessary with the engine is the prevention of excessive pressure within the combustion chambers. This pressure is the pressure P3 delivered by the high pressure compressor. For this purpose a pressure limiter unit 146 is provided. The pressure P3 enters the unit through a filter 147 into a chamber 148 where the pressure reacts on a bellows 149 connected to receive ambient atmospheric pressure ($P_{NAC}$). This is the pressure which exists in the engine nacelle. The bellows 149 is connected to operate on a lever 151 which is pivotally of flexurally mounted at 152. The pressure P3 acting within the chamber 148 escapes from the chamber through an orifice 153 which is connected in series with a restrictor 154 connected back to $P_{NAC}$ pressure. The junction of the orifice 153 and restrictor 154 is connected to pipe 85. The bellows 149 is arranged to compress when the pressure P3 reaches an excessive value to move lever 151 to a position where it interrupts the flow of air into the orifice 153. Such interruption will reduce the pressure in pipe 85 which will reduce the force exerted by bellows 79 in the throttle 52. This reduction in bellows force will upset the balance of the lever 76 and cause movement of throttle piston 53 in the sense to reduce the throttle aperture 58 and thus reduce the fuel flow to the engine in an overriding manner.

The stabilising jets 14, 15, 16, 17 and 18 of the aircraft shown in FIG. 1 require the flow of high pressure air from the high pressure compressor and when the aircraft is in its vertical flight mode i.e. the nozzles 6 and 7 are pointed downwardly, the flow of stabilising air will cause a change in the engine operating conditions which will require altered fuel flow to the engine. There are two states of engine operation to be considered, i.e. engine acceleration operation and engine constant speed operation. During engine acceleration the flow of air from the high pressure compressor to the stabilising jets will mean that a smaller quantity of air at a somewhat lower pressure is fed into the combustion chambers. Clearly if the engine is to maintain the same vertical thrust from the jet nozzles 7 more fuel must be burnt in the reduced quantity of air entering the combustion chambers. To compensate the fuel system to provide such extra fuel the reset unit 155 is provided. Basically the unit comprises a throttle piston 156 adjustably movable in a cylinder through a pair of spaced ports 157 and 158, a throttle aperture 159 within the piston providing a variable connection between the ports depending on the position of the piston. The port 157 connects through pipe 161 to the pipe 51 upstream of the throttle 52. The port 158 connects through pipe 162 to the pipe 56 downstream of the throttle 52. Effectively the unit 155 provides a separate throttle in parallel with the throttle valve 52, which since the pressure drop across the throttle 52 is controlled by the by-pass valve 91 will ensure an extra fuel flow in accordance with the setting of the piston 156. The piston 156 is adjusted by the control signals applied to a pair of opposed bellows 163 and 164. Bellows 163 receives pressure P3 from the high pressure compressor and the bellows 164 receives the general pressure PD existing in the ducts 9, 11, 12 and 13. This pressure PD will vary in accordance with the flow rate of high pressure air to the stabilising nozzles. The two bellows 163 and 164 are connected together by a yoke 165 which reacts at a pin 166 on a lever 167 mounted in a chamber 168. The lever is pivoted at a fulcrum 169 and carried a half-ball valve 160 which controls escape flow from a vent 170. A servo-piston 171 secured to the throttle piston 156 moves within a cylinder having upper and lower chambers 172 and 173. In the upper chamber 172 servo fuel from pipe 49 acts on a small area of piston 171. A restrictor 174 feeds liquid at pressure to the lower chamber 173 where the pressure will act on a larger area of piston 171. The vent 170 is also connected to the chamber 173 and escape flow from the vent 170 will determine a lower pressure within the lower chamber 173. Movement of the half-ball valve 160 to increase escape flow from the vent 170 will reduce pressure in the lower chamber 173 causing the servo-piston 171 to move downwardly. The resulting movement of the piston 156 is fed back on to the lever 167 by means of a spring 175 so that movement of piston 156 as a result of alteration of the position of the half-ball valve 160 will restore the half-ball valve 171 into an equilibrium position where the escape flow is such that there is a force balance on piston 171 as a result of the difference pressures in chambers 172 and 173. The selection of air flow in any of the ducts to the stabilising nozzles will cause a reduction in the pressure PD fed to the bellows 164 which will cause lift of the half-ball valve 160 to reduce pressure in chamber 173. Downward movement of the piston 156 will increase the size of aperture 159 to the ports 157 and 158 thus permitting an increase in fuel flow into the pipe 56. The shaping of the throttle aperture 159 ensures that the increased fuel fed to the engine is in accordance with the reduction of pressure PD which in turn is in accordance with the actual flow rate of air fed to the stabilising nozzles. By this means the acceleration rate of the engine may be kept as high as possible irrespectively of the amount of air fed to the stabilising nozzles. The use of compressor delivery pressure P3 as part of the signal control for extra fuel flow ensures a degree of altitude compensation of the extra fuel flow. Also the flyweights 113 will operate to control pressure drop at aperture 159 as at aperture 58 ensuring speed compensation for the extra fuel flow.

The permitted increase in fuel flow to the engine by operation of the unit 155 when air flow is selected for any stabilising jet operates principally to increase fuel flow during the acceleration mode of the engine. To a lesser degree however, the opening of the throttle aperture 159 following demand for stabilising jet air flow during constant speed operation of the engine will also involve a slight resetting of the mechanical governor 121. Since the mechanical governor 121 acts overridingly to control the position of the throttle piston 53 during constant speed operation of the engine, the opening of the extra throttle passage 159 when air flows from the stabilising jets will itself increase fuel flow to the engine which will initially react on the governor 121 as an increased pressure at half-ball valve 131. Engine speed will change both as a result of increased fuel flow and of the bleed off of high pressure air, and the governor 121 will then readjust the throttle valve 52 to give a slightly lower fuel flow rate. The overall effect will be a slight reduction of the constant engine speed and a slightly increased total fuel flow to the engine.

The throttle unit 52 is the first throttle unit which assists in determination of fuel flow to the engine. Fuel leaving the first throttle unit 52 then passes through the speed throttle unit 176 before passing to the engine. The second throttle unit performs the dual function of a shut-off valve and a fuel scheduling device. The throttle unit 176 comprises a hollow piston 177 movable in a cylinder 178 to control the relative flows at four ports 179, 181, 182 and 183. The pipe 56 connects to the port 182 and the pipe 19 for the engine connects to the port 179. The upper and lower ends of the cylinder 178 are connected to the low pressure network 36 so that no hydraulic pressure acts in the endwise sense on the throttle piston 177. The port 183 also connects to the low pressure network 36. The post 181 connects to a pipe 184 to carry fuel by-passed from the pipe 56 during the controlling function exerted by the throttle valve 176.

The throttle piston 177 is movable in the endwise sense by means of a lever 185 mechanically connected for movement by the pilot's control lever 129. The cam 128 and the lever 185 are moved together by the pilot's lever 129. Within the throttle piston 177 there are three ports 186, 187 and 188 which connect to the hollow interior of the piston. The port 186 over the whole range of movement of piston 177 makes an unthrottled connection with port 182. In the shut-off position of the throttle piston 177 (i.e. its uppermost position) port 186 forms a substantially unrestricted connection between the ports 182 and 183 to by-pass all delivered fuel back to the low pressure network 36. In the fuel scheduling position of the throttle 177 corresponding to the movement of the pilot's lever 129 between idle and full speed (the range of movement of the piston 177 except for its uppermost position) the port 188 will make a variable throttled connection with the port 179 and the port 187 will make a substantially unthrottled connection with the port 181. Thus over the operating range from idle to full speed, fuel flow to the engine passes from pipe 56 through ports 182 and 186 into the hollow interior of piston 177 and then leaves through two paths, one comprising the throttle aperture 188 in the port 179 to feed to the engine, and the other comprising the port 187 whereby fuel may pass through port 181 and 184 to the by-pass valve 189. In the shut-off position of the valve 176 the port 188 will be closed by the land between ports 181 and 179 and the port 187 will connect to the port 182.

A second by-pass valve 189 co-operates with the second throttle valve 176. The by-pass valve comprises a flexible diaphragm 191 mounted in between upper and lower chambers 192 and 193 in the unit 189. The lower chamber 193 is connected directly to the pipe 184 and the upper chamber 192 is connected directly to the port 181 via pipe 194. Thus the pressure drop occurring between port 182 and port 179 due to the engine fuel flow through the throttle aperture 188 will be fed to act on opposite sides of the diaphragm 191 to adjust its position against a spring 195. The diaphragm 191 controls the by-pass flow of fuel from the chamber 193 through a port 196, such by-pass flow from port 196 entering the low pressure network 36. The action of the diaphragm 191 therefore is to control pressure drop occurring between ports 182 and 179 in the throttle unit 176 to a substantially constant value which is in accordance with the loading of the spring 195. Under some circumstances of operation the fuel flow through the throttle unit 176 will not be sufficient to produce a pressure drop which will open the by-pass valve 189, in which case all the fuel entering the second throttle unit 176 will leave through the pipe 19 to the engine.

For the purpose of providing a minimum idling flow of fuel to the engine, the by-pass valve 189 is provided with an adjustable restrictor 197 to carry fuel between the pipes 194 and 184 parallel with the flow path presented by the throttle aperture 188. The restrictor 197 then provides a minimum value for the throttle aperture 188 to maintain a minimum fuel flow to the engine under idling conditions. In the shut-off position for the throttle valve 176 the port 181 will be isolated since the port 187 is then in register with port 182 and therefore all flow to the engine is cut off. Also the by-pass port 181 is closed.

Convention means for water injection may be provided in the engine on operation of a suitable control by the pilot in order to lower turbine temperatures for short periods during high power operation. The means for water injection concern the present invention in so far that the fuel system must be capable of adjustment whilst water is injected into the engine to supply a greater controlled fuel flow. The water injection system for the engine includes a signalling switch operated as a result of water injection to the engine, such switch being arranged to energise a pair of solenoids 198 and 199 in the fuel system. The solenoid 198 when energised will open a valve 201 between two pipes 202 and 203. The pipe 202 connects to the pipe 19 delivering fuel to the engine whilst the pipe 203 extends to an upper auxiliary valve section 204 of throttle unit 176. Valve section 204 is really a shut-off valve which opens connection between the pipe 203 and a pipe 205 over the whole range of movement of the pilot's throttle 129 with the exception that the connection is cut off when the control handle reaches the shut-off position. The pipe 205 is connected to the servo supply pipes 49 which in turn connects back to the filter 48 at the junction of pipes 38 and 51. Therefore when the solenoid 198 is energised to open valve 201 a connection is opened from the pipe 51 to the pipe 19 providing a by-pass circuit for the two throttle valves 52 and 176. The flow rate of fuel in this by-pass circuit is determined firstly by the total pressure drop controlled across the two throttle valves 52 and 176 and the restrictive effect of the valve 201. The valve 201 is particularly concerned with operational conditions during engine acceleration with water injection. The valve 199 is also energised during water injection and operates to load a spring 200 on to the lever 123 of the mechanical governor in the sense to raise the governed speed of the engine and thereby cause more fuel to flow to the engine. Water injection is used solely during low lever flying, principally during take-off, to enable the maximum amount of engine pwer to be obtained. The water injection permits more fuel to be injected into the engine, the cooling effect of the water then preventing excessive rise of turbine temperature.

For normal engine accelerations the pilot's lever 129 is moved to select an increased speed, such movement jointly increasing the load on the governor spring 127 and increasing the effective size of throttle aperture 188. Increasing the load of the governor spring will close half-ball valve 131 on to the vent 65. The servo-piston 59 controlling the throttle piston 53 is then under the control of the half-ball valve 78 reacting through the diaphragm 71 of the discriminator 67. The servo-piston 59 will then move piston 53 to a position determined by the engine gas pressures reacting on the bellows 79 and 81 and the by-pass valve 91 will operate to control by-pass in accordance with the square of speed of the high pressure spool. Thus the fuel flow through the throttle 52 is sufficient for safe engine acceleration. The engine will then accelerate until the fuel flow is limited either by the throttle valve 178 or by the mechanical governor. If the selected position of the pilot's lever 129 is less than about 80 percent of the full speed position, it is more likely that the flow limit of the throttle 176 will be attained before the mechanical governor reaches a controlling speed. The fuel flow to the engine is then limited when the pressure drop of fuel flow through the throttle aperture 188 reaches a value which overcomes the pressure loading of spring 195 on diaphragm 191 at which point the diaphragm will lift from the vent 196 to allow by-pass from the fuel delivered to valve 176 so that the flow leaving valve 176 through pipe 19 is sufficient only to produce the fixed pressure drop determined by the by-pass valve 189. By-passed fuel goes back to the low pressure network 36. If however, the pilot's lever 129 is set at a higher position for example above 80 percent of the maximum position it is more likely that the engine speed will be limited by the mechanical governor in that the centrifugal force generated by flyweights 124 on rod 126 will begin to overcome the loading of the spring 127 thus lifting the half-ball valve 131 from vent 65. When this happens the slightly lowered pressure in the lower chamber 69 of throttle valve 52 will cause the flexible diaphragm 71 to close the vent 72 so that the reduced pressure determined in the vent pipe 65 will act solely in the lower end 64 of servo cylinder 61 to control the position of the throttle piston 53. Since the pressure drop across the throttle valve 52 is capable only of slow variation, the action of the flyweights acting against the spring 127 will control engine speed accurately by determining the size of the throttling aperture 58 in which fuel flows to the engine.

The arrangement of the two throttle valves 52 and 176 is such that for all engine speeds above about 85 percent of maximum speed the mechanical governor must take control, the fuel flow permitted by the mechanical governor when it passes through the throttling aperture 188 of throttle valve 176 not producing a sufficient pressure drop to open the by-pass valve 189.

For selected lever positions below 85 percent the ultimate control of the engine will be either by the throttle valve 176 or by the mechanical governor, depending on the altitude of operation and the resulting fuel flow necessary to maintain a selected speed. For quite low selected speeds the throttle valve 176 will normally effect control since the cam 128 is so arranged that for low percentage positions of the control lever 129 the effective speeds selected by the mechanical governor is always such as to demand a greater fuel flow to the engine than would be permitted by the setting of the throttle valve 176 for that position of lever 129. There is however, a range of positions for the control lever 129 lying between about 60 percent and 85 percent of the full speed position in which either the throttle 176 or the mechanical governor 121 will control engine speed in the constant speed state, this depending on the alitutde of flight. With increase in altitude the fuel flow necessary to maintain a particular constant speed of the engine will become lower and therefore with increase in altitude the range of speeds over which the mechanical governor will control will extend more and more from the 85 percent lever position back towards the 60 percent lever position. It will however be seen that engine speed is smoothly adjustable by movement of the control lever 129 quite irrespectively of the altitude of flight. More particularly, however, the upper speed range above about 85 percent is always under accurate governor control. Since the creep of the governor is compensated by the creep control device 130, 133, 135, the full speed position of the lever 129 controls the maximum safe speeds for the engine under normal operating conditions. Under water injection operation it is true that the mechanical governor would be set to a higher speed but the higher speed is then permissible because of the temperature reducing effect of the water on the turbine.

The flyweights 124 in the mechanical governor may be driven by the high or the low pressure spool in the two-spool engine but as described flyweights 124 are driven by the low pressure spool.

An emergency system is provided for the fuel system which comprises the change-over valve 37, the emergency throttle unit 206 and the emergency by-pass valve 207. The emergency throttle valve 206 comprises a hollow throttle piston 208 arranged to control flow between a pair of ports 209 and 211. The hollow piston 208 includes a port 212 constantly in connection with the port 211 during piston movement and a throttle aperture 213 in overlapping relation with the port 209 so that its effective throttle aperture is varied during piston movement. The piston is adjusted in the axial direction by means of a lever 214 which is mechanically connected for movement with the pilot's lever 129.

The by-pass valve 207 includes an upper and a lower chamber 216 and 217 separated by a flexible diaphragm 218 loaded by spring 219 on to a vent 221 connected to the low pressure network 36.

The port 209 in the emergency throttle 206 connects to a pipe 222 which extends to connect into the engine pipe 19. A non-return valve 223 is located in the pipe 19 between the throttle valve 176 and the junction of pipe 19 with pipe 222.

If under any circumstances of operation it appears to the pilot that the fuel system is not operating correctly, the pilot will press an emergency button to energise the emergency solenoid 45 to open valve 44 and cause the change-over valve 37 to connect pump delivery 33 to the emergency pipe 39. From the emergency pipe 39 fuel enters the port 211 of the emergency throttle and enters the hollow piston 208 through port 212. Fuel leaves through the throttle aperture 213 into a port 209 and pipe 222. The pressure drop occurring at the throttle aperture is connected through pipe 39 to the lower chamber 217 and through pipe 224 to the upper chamber 216 of the emergency by-pass 207 and if the pressure drop is sufficient to overcome the loading of the spring 219 the flexible diaphragm 218 will move to open the seat 221 so that fuel delivered from the emergency pipe 39 may pass into the low pressure network 36, the remaining fuel leaving the emergency throttle being just sufficient to maintain a pressure drop at the throttle aperture 213 to hold the diaphragm 218 in its by-passing condition. The emergency system comprises principally the simple flow control formed by the emergency throttle and the emergency by-pass and the fuel flow permitted to the engine by this emergency system is arranged to be about the same as the fuel flow permitted to the engine by the second throttle 176. On switching over to the emergency system the pilot will lose the various refined controls for his engine and clearly must adjust the emergency throttle very carefully in order to adjust engine speed. Nevertheless, the emergency throttle 208 and emergency by-pass 207 represent a simple but effective fuel control system. The non-return valve 223 is essential to prevent metered fuel from the emergency system from leaking back into the normal system.

I claim:

1. In an aircraft having a gas-turbine engine, at least one main jet nozzle directed downwardly to provide weight-supporting thrust for the aircraft, a plurality of stabilising nozzles, duct-means for feeding air at pressure from the engine compressor to the stabilising nozzles, and a pilot's adjustable valve means for adjusting air flow from the stabilising nozzles to control the attitude of the aircraft, the provision of a fuel system for the engine comprising, a source of fuel at pressure, a constant speed fuel flow control to feed fuel from the source to the engine for constant and slowly varying speeds, an acceleration fuel flow control to feed fuel from the source to the engine during engine acceleration at a rate ensuring safe acceleration without compressor stall, an auxiliary fuel flow control and control means for said auxiliary fuel flow control responsive to air flow to at least one stabilizing nozzle to supply extra fuel flow to the engine during engine acceleration over and above the fuel flow supplied by the acceleration fuel flow control.

2. A fuel system as claimed in claim 1 including compensating means for said auxiliary fuel flow control responsive to compressor delivery pressure.

3. A fuel system as claimed in claim 2 wherein said compensating means is also responsive to engine speed.

4. A fuel system as claimed in claim 1 wherein said control means for said auxiliary fuel flow control includes a proportional device arranged to supply fuel flow in accordance with the air flow rate selected for the stabilising nozzles.

5. A fuel system as claimed in claim 1 wherein the acceleration fuel flow control comprises a main variable throttle through which fuel flows to the engine, first adjustment means for the main throttle controlled by at least one engine air pressure, a by-pass valve connected to by-pass fuel from upstream of the thorttle, and pressure drop means responsive to pressure drop at the throttle to adjust the by-pass valve so that the remaining fuel flow passing through the throttle to the engine gives a predetermined pressure drop at the throttle.

6. A fuel system as claimed in claim 5 wherein the said pressure drop means includes engine driven flyweights arranged to apply a force proportional to the square of engine speed to the pressure drop means to ensure that fuel flow to the engine through the main throttle generates a pressure drop proportional to the square of engine speed.

7. A fuel system as claimed in claim 6 wherein the auxiliary fuel flow control comprises an auxiliary variable throttle connected in parallel with the said main variable throttle, and auxiliary adjustment means for the auxiliary throttle responsive to the air flow rate within the duct means to adjust the auxiliary throttle so that the extra fuel flow to the engine permitted by the auxiliary throttle is in accordance with the air flow rate within the duct means.

8. A fuel system as claimed in claim 7 wherein the said means responsive to air flow within the duct means comprises a pair of opposed bellows, one connected to receive engine compressor delivery pressure and the other connected to receive pressure from the duct means whereby the bellows generates a force proportional to pressure drop between the engine compressor and the duct means, and servo means for adjusting the auxiliary throttle in accordance with said force.

9. A fuel system as claimed in claim 7 including an engine-driven flyweight device driven at a speed proportional to engine speed, manually-adjustable spring means acting on the flyweight device to oppose centrifugal movement, manually-operable means for adjusting the load of the spring means, second adjustment means for the main throttle responsive to centrifugal movement of the flyweight device, discriminator means responsive to the first and the second adjustment means to connect the adjustment to adjust the main throttle which will result in the lower fuel flow to the engine.

* * * * *